(12) United States Patent
Moll et al.

(10) Patent No.: US 7,820,040 B2
(45) Date of Patent: Oct. 26, 2010

(54) WATER POLLUTION TRAP AND METHODS OF USE THEREOF

(76) Inventors: John Sebastian Moll, 1495 Chalet Cir., Lawrenceville, GA (US) 30043; Clark Joseph Use, 2208 Liberty La., Conyers, GA (US) 30094

( * ) Notice: Subject to any disclaimer, the term of this patent is extended or adjusted under 35 U.S.C. 154(b) by 504 days.

(21) Appl. No.: 11/862,771

(22) Filed: Sep. 27, 2007

(65) Prior Publication Data

US 2008/0073295 A1 Mar. 27, 2008

Related U.S. Application Data

(60) Provisional application No. 60/827,144, filed on Sep. 27, 2006.

(51) Int. Cl.
*B01D 33/35* (2006.01)
(52) U.S. Cl. .............. 210/131; 210/132; 210/155; 210/314; 210/335; 210/354; 210/522
(58) Field of Classification Search .............. 55/309, 55/422, 482, 485, 487, 490, 495; 210/97, 210/131, 155, 162, 163, 305–307, 314–317, 210/335, 354–356, 359, 483, 521, 522, 132
See application file for complete search history.

(56) References Cited

U.S. PATENT DOCUMENTS

| | | | | |
|---|---|---|---|---|
| 1,639,797 | A * | 8/1927 | Dickinson | 209/269 |
| 6,190,545 | B1 | 2/2001 | Williamson | |
| 6,217,756 | B1 * | 4/2001 | Martinez | 210/163 |
| 6,478,954 | B1 | 11/2002 | Turner, Jr. et al. | |
| 6,797,161 | B2 | 9/2004 | Use et al. | |
| 6,936,163 | B2 | 8/2005 | Use et al. | |
| 6,939,461 | B2 | 9/2005 | Use et al. | |
| 6,951,607 | B2 | 10/2005 | Use et al. | |
| 6,994,783 | B2 | 2/2006 | Use et al. | |
| 7,011,743 | B2 | 3/2006 | Use et al. | |
| 7,037,436 | B2 | 5/2006 | Use et al. | |
| 2001/0047954 | A1 | 12/2001 | Happel | |
| 2003/0121849 | A1 * | 7/2003 | Use et al. | 210/521 |
| 2003/0164341 | A1 | 9/2003 | Use et al. | |
| 2006/0091049 | A1 | 5/2006 | Hurst et al. | |

OTHER PUBLICATIONS

Patent Cooperation Treaty, International Search Report and Written Opinion of the International Searching Authority, or the Declaration, Feb. 26, 2008, 8 pages, for application No. PCT/US07/79691.

* cited by examiner

*Primary Examiner*—Joseph W Drodge
(74) *Attorney, Agent, or Firm*—Gardner Groff Greenwald & Villanueva, P.C.

(57) ABSTRACT

A filtration device and method for removing pollutants from fluid such as storm-water. The filtration device has a chamber including a series of pivotal filtration assemblies each including a weir and filter. The filters are selected and positioned for sequentially filtering larger then smaller pollutant particles from the water flowing through the device. The weirs are configured and positioned for sequentially permitting water overflow of (and thereby taking off-line) the smaller-particle size filters then the larger-particle size filters from the water flowing through the device. And the filtration assemblies are pivotally mounted to the chamber walls and configured so that, when one of the filters becomes clogged, the water pressure against it causes that filter assembly to pivot into a bypass position permitting water to flow under it.

13 Claims, 5 Drawing Sheets

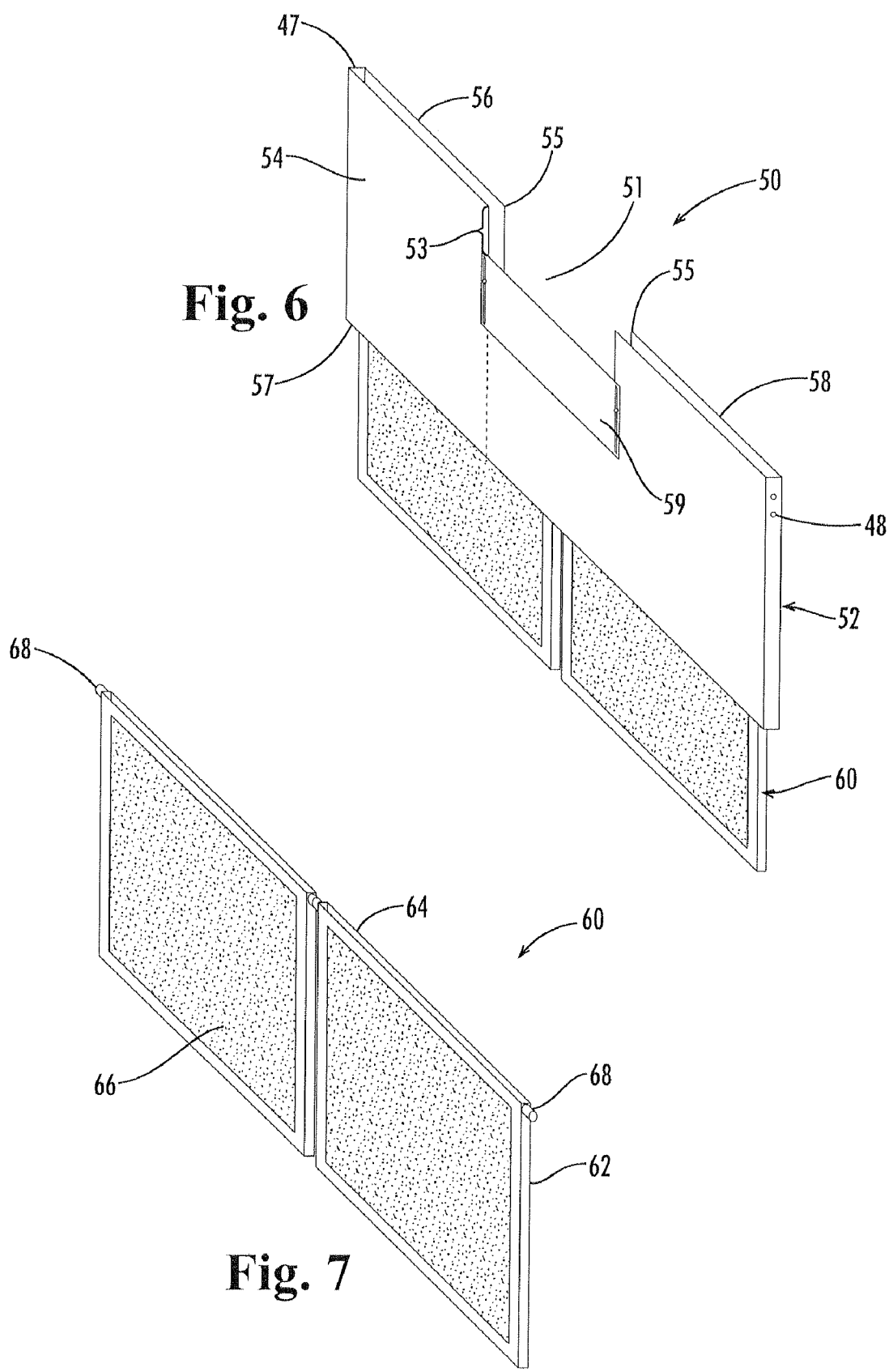

WATER POLLUTION TRAP AND METHODS OF USE THEREOF

CROSS REFERENCE TO RELATED APPLICATIONS

This application claims the priority benefit of U.S. Provisional Application Ser. No. 60/827,144, filed Sep. 27, 2006. This application is hereby incorporated by reference in its entirety for all of its teachings.

TECHNICAL FIELD

The present invention relates generally to water pollution traps and, more particularly, to oil/grit separators for separating and collecting various pollutants from storm-water runoff.

BACKGROUND OF THE INVENTION

During rainstorms, water that is not absorbed into the ground runs off into storm sewer systems for delivery into freshwater systems such as streams, rivers, lakes, and wetlands. While flowing across parking lots, landscaped areas, and other surfaces, the storm-water runoff picks up debris and pollutants and carries them into the storm sewer systems. Particularly large amounts of pollutants are picked up at shopping centers with large parking lots, oil-change and auto-repair shops, gas stations, and so forth. These pollutants include motor oil and other hydrocarbons, particulate matter such as sand and grit, and miscellaneous debris such as vegetative matter, paper, plastic, and foam cups. For example, about 200 pounds of miscellaneous debris and 1,500 pounds of sand and grit are commonly carried off by storm-water runoff from some one-acre parking lots in 90 days.

To maintain freshwater systems, most cities and counties have regulations requiring that some of the pollutants be removed from the storm-water runoff before entering their storm sewer systems. In order to meet these regulations, facilities typically install on-site pollution traps to filter the storm-water runoff. These pollution traps are referred to as "water quality vaults," which target multiple pollutants.

Most conventional pollution traps provide only "first flush" filtration during the typical local storm event, but permit bypassing the filtration stage for larger storms. In fact, many jurisdictions require bypassing, some even at typical storm-water flows. Bypassing filtration is a problem because most pollutants are more easily picked up and transported by storm-water during higher flow periods. Unfortunately, just when the traps are needed most, a lot of pollutants bypass them and are delivered into the storm sewer systems. Moreover, most pollution traps that do not provide for bypassing accommodate the larger flows because they are oversized, which adds significantly to the cost to build, install, and maintain them.

Another problem with many pollution traps is they simply filter the storm-water at the natural flow rate of the storm-water passing through it. The faster the storm-water flows through the trap, the less particulate matter pollutants can settle in the trap. Some other traps detain the storm-water for a brief time to allow some of the particulate matter to settle; however, these traps only detain the water for a few minutes at most, and even a small water flow will cause the particles to be re-suspended in the water. Therefore, these pollution traps permit significant amounts of particulate matter pollutants to pass though them, even before bypass occurs.

In addition, the filtering systems of some pollution traps include screens for capturing miscellaneous debris. These screens are typically partially submerged in the water in the middle of the trap so that the debris is always floating in the water. Because the debris is always floating, it does not block the screen. The problem with this configuration is that vegetation, paper, and other absorbent miscellaneous debris tend to become waterlogged, rot, and deteriorate into smaller parts. These small parts then pass through the screen, are re-suspended in the water, and are carried out of the trap. Moreover, vegetative matter contains nitrogen and phosphorus and carries other pollutants such as fertilizer, pesticides, and oils. Additionally, paper products carry inks and other surface adherents. Thus, these additional pollutants also pass through the screen with the deteriorated debris and out of the trap.

Although pollutants in storm-water are generally larger articles and particles, smaller particles and dissolved materials are also present in the water. For example, dissolved metals and living organisms harmful to humans if consumed are present. Current filtration devices are limited with respect to removing this type of pollutants.

Accordingly, there is a need for a pollution trap that stays on-line and filters all the storm-water runoff from a parcel of land, without bypassing filtration or overflowing during larger-than-typical storms. In addition, a pollution trap is needed that better induces settling of particulate matter and reduces waterlogging of absorbent miscellaneous debris, to provide improved filtration of pollutants from the storm-water. Furthermore, a need exists for a pollution trap that is cost-efficient to build, install, and maintain. Finally, there is a need not only to remove gross pollutants such as debris, there is also a need to remove micro-pollutants (i.e., particles in the range from 20 μm to 4,000 μm) and dissolved pollutants. The pollution traps described herein address these needs.

SUMMARY OF THE INVENTION

Described herein is a filtration device for removing pollutants from fluids such as storm-water, and methods of use thereof. The filtration device has a chamber including a series of pivotal filtration assemblies each including a weir and a filter extending therefrom. The filters are selected and positioned for sequentially filtering larger then smaller pollutant particles from the water flowing through the device. The weirs are configured and positioned for sequentially permitting water overflow of (and thereby taking off-line) the smaller-particle size filters then the larger-particle size filters from the water flowing through the device. And the filtration assemblies are pivotally mounted to the chamber walls and configured so that, when one of the filters becomes clogged, the water pressure against it causes that filter assembly to pivot into a bypass position permitting water to flow under it.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

FIG. 6 is a perspective view of one of the pivotal filter assemblies of FIG. 1, showing a weir and a filter.

FIG. 7 is a perspective view of the filter of FIG. 6.

DETAILED DESCRIPTION

Figure 1:
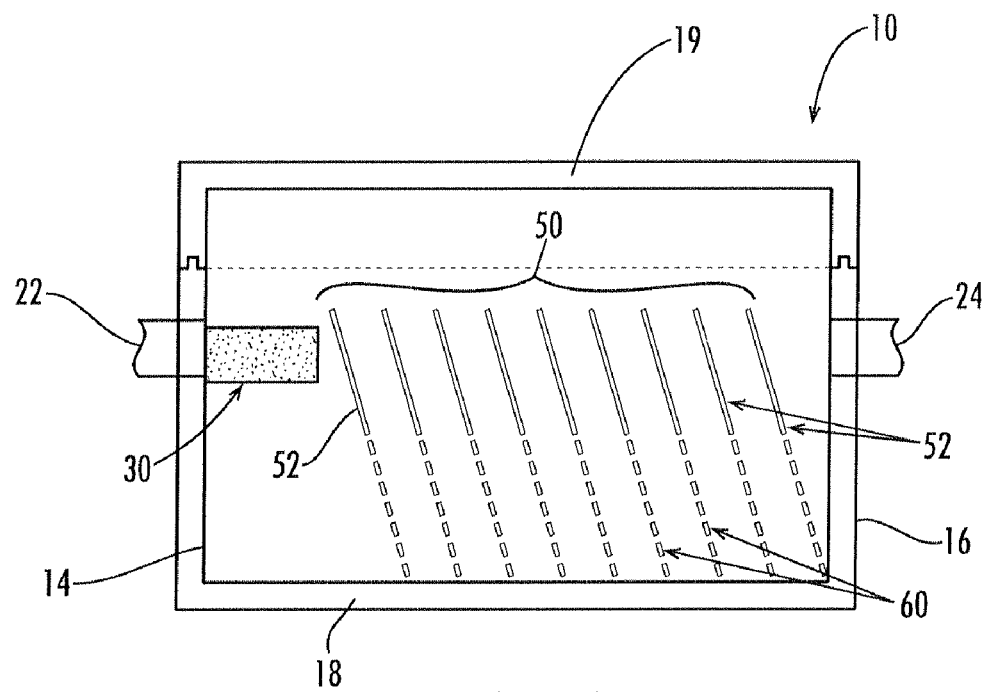
FIG. 1 is a side view of a filtration device according to an example embodiment of the present invention, showing a basket-shaped screen and a series of pivotal filter assemblies.

Before the present devices and methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting. It must be noted that, as used in the specification and the appended claims, the singular forms "a," "an" and "the" include plural referents unless the context clearly dictates otherwise. Thus, for example, reference to "a filter" includes two or more filters.

Referring now to the drawing figures, wherein like reference numerals represent like parts throughout the several views, the device described herein provides for separating pollutants from water such as, for example, storm-water runoff, and retaining the pollutants in the device. The device is well suited for filtering and removing gross pollutants including floatable matter such as motor oil, other hydrocarbons, and detergents; particulate matter such as sand, dirt, and grit; and miscellaneous debris such as vegetative matter from trees, shrubberies, etc., paper and plastic trash, aluminum foil wrappers, foam cups, and so forth. In addition, a person of ordinary skill in the art could adapt the device described herein in order to separate other types of pollution or other types of matter from liquids other than storm-water, if so desired. The filtration devices described herein are also useful in removing micro-pollutants and dissolved pollutants. In one aspect, the pollutants have a particle size from 20 µm to 4,000 µm, 20 µm to 3,000 µm, 20 µm to 2,000 µm, 20 µm to 1,000 µm, 20 µm to 500 µm, 20 µm to 250 µm, or 20 µm to 125 µm. These pollutants include metals and microorganisms harmful to humans.

In general, the filtration device comprises a chamber with an inlet, an outlet, and one or more filtration assemblies such as a screen, a plurality of pivotal filter assemblies, or both, which are disposed in the chamber between the inlet and outlet. FIGS. 1-5 show a filtration device 10 according to an exemplary embodiment of the invention. The device 10 includes a chamber 12 that houses a screen 30 and a series of pivotal filter assemblies 40. In one aspect, the screen 30 is positioned adjacent to the inlet 22, and the pivotal filters 40 are positioned between the screen 30 and the outlet 24.

In the depicted embodiment, the chamber 12 is rectangular and is formed by sidewalls 13 and 15, endwalls 14 and 16, a floor 18, and a lid 19. The chamber sidewalls 13 and 15, endwalls 14 and 16, and floor 19 can be made of reinforced concrete, and may be sealed with a coating such as a bituminous material for making the chamber watertight. The concrete chamber 12 can be pre-cast and hauled to the installation location, though it could be cast on-site if so desired.

For convenience in constructing, hauling, and installing the chamber 12, it can be formed into two or more sections. For example, a base section can be made with a standard size, and one or more riser sections can be made in a variety of heights or custom-made per job. In this way, the height of the riser section is selected so that the lid 19 can be at about ground level given the depth at which the base section will be installed. In installations where the top of the base section is at grade, no riser section would be used. Alternatively, the chamber 12 can be integrally made as a single piece.

The lid 19 covers the open top of the chamber 12, and can be at least partially removable in order to provide ready access to the inside of the chamber for maintenance of the device 10. For example, the lid 19 can be made of three aluminum panels, with a fixed middle panel and two end panels pivotally coupled to the middle one. Alternatively, the lid 19 can be made of concrete and include a manhole ring or hatch and a cover. In the embodiment depicted in FIG. 5, there are two hatches in the lid 19 and two removable hatch covers 26 and 28 that can provide access to the interior of the chamber. The manhole ring or hatch cover can be made of a variety of different materials including, but not limited to, cast iron steel or aluminum. In addition, when the lid 19 and the chamber walls 13-16 are installed in areas where they are driven over, they can be sized and/or reinforced to withstand the traffic loadings they are subjected to.

It is contemplated that the lid 19 and the chamber walls 13-16 can be made in other regular or irregular shapes and configurations, and can be made of other strong and durable materials, as may be desirable in a given application. For example, the chamber walls 13-16 could be made of fiberglass, hard plastic, or a composite, and/or the chamber 12 could be generally L-shaped or triangular with two inlets and one outlet.

Additionally, the chamber 12 has an inlet 22 in one of the end walls 14 through which the water flows into the chamber and an outlet 24 in the other end wall 16 through which the water flows out. The inlet 22 and the outlet 24 are sized and shaped to receive or otherwise connect to the pipes of conventional storm sewer systems. If desired, the inlet 22 and the outlet 24 can include stub-outs for connecting to the conventional storm sewer pipes. The stub-outs can be provided by, for example, sections of metal or PVC pipe.

The inlet 22 and the outlet 24 are sized to handle a predetermined maximum flow rate. For example, the maximum flow rate can be based on the 25-year storm (the worst storm over a 25-year period for the geographic location, on average), or for an otherwise-defined catastrophic or larger-than-normal storm. Of course, during most storms, the inlet 26 and the outlet 28 are not exposed to the water flow intensity of the 25-year storm.

It will be understood that many variations in the dimensions, shapes, and materials may be suitably used, depending on the use of the device. For example, when the device is used to remove pollutants from storm-water, the size, grade, ground covering, and use of the tributary area to be drained, the typical and maximum rainfall during the design worst storm event, and the local restrictions on flow rates are considered when preparing the design of the chamber.

Figures 2, 3:
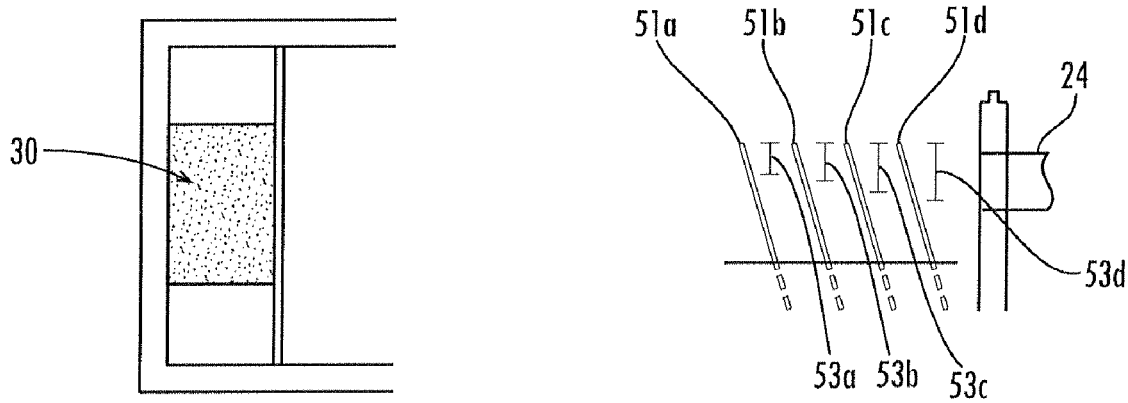
FIG. 2 is a plan view detail of the basket of FIG. 1.
FIG. 3 is a side view detail of the pivotal filter assemblies of FIG. 1.

As shown in FIGS. 1 and 2, in the depicted embodiment the screen 30 is basket-shaped and configured to catch most to all of the floating miscellaneous debris such as vegetative matter, plastic, and paper that might otherwise collect in the chamber 12. In one aspect, when the device 10 is used to filter storm-water, the screen basket 30 is positioned adjacent the inlet 22 and flush against the inlet end wall 14. In this position, the screen basket 30 collects and retains the debris as it enters the chamber 12 and allows the water to pass through it. In one aspect, the screen basket 30 is suspended above the at-rest water level (the height above the chamber floor of the outlet). Here, the collected debris is suspended above the water level so that it does not become waterlogged, break down into smaller pieces, and wash through the screen basket 30. Additionally, other pollutants such as fertilizer, pesticides, oils, inks, surface adherents, and other pollutants contained in or carried by vegetative matter and paper also remain trapped by the screen basket 30. The result is a significant increase in the amount of debris and other pollutants retained over time by the screen basket 30.

In one aspect, the screen basket 30 has an opening that is adjacent the inlet 22 for allowing the debris into the chamber 12. The screen basket 30 can be supported by a rigid frame that holds a liner. The frame can be made of aluminum grating and has a bottom, a side, and ends. In one aspect, the liner can be made of aluminum ¼ inch mesh. In another aspect, polymers such as, for example, polyacrylamide, can be included in the liner to remove small solid particles. Alternatively, the screen basket 30 can be made in other shapes, sizes, and materials. For example, the liner can be made of 1/16 or 1/8 inch mesh, perforated panels, lattice structures, or other structures with filtering spaces, made of stainless steel, plastic, a composite, or another material. In one aspect, the frame bottom and the liner bottom can be positioned at or above the at-rest water level.

For ease of removing the trapped debris and particles from the screen basket 30, the screen basket can have handles for grasping and easily removing it from the chamber 12. In addition, the screen basket 30 can be supported on mounting structures such as mounting brackets, pins, bolts, or other mounting structures. The mounting structures support the screen basket 30 and restrain it from lateral or downward movement, but permit removal of the screen by lifting it from the brackets. Thus, the screen basket 30 does not have to be decoupled from the mounting structures for its removal from the chamber 12.

In the embodiment depicted in FIGS. 1 and 3, the plurality of pivotal filter assemblies 50 are disposed in the chamber in series between the inlet 22 and outlet 24. The term "plurality" as used herein with respect to the number of pivotal filters means two or more pivotal filters. The number and spacing of the pivotal filter assemblies 50 can vary based on the types of pollutants present in the water and the filter materials selected. In one aspect, 2 to 20 pivotal filter assemblies 50 are present in the chamber. In another aspect, 2 to 18, 2 to 16, 2 to 14, 2 to 12, or 2 to 10 pivotal filter assemblies 50 are present in the chamber.

Figure 4:
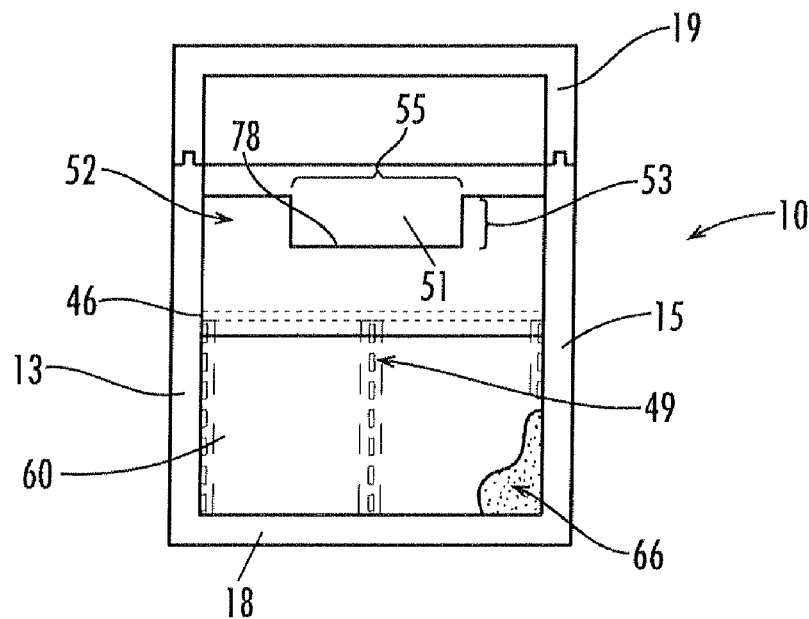
FIG. 4 is a right end view of the filtration device of FIG. 1 with the right endwall removed to show details of the pivotal filter assemblies.
Figure 5:
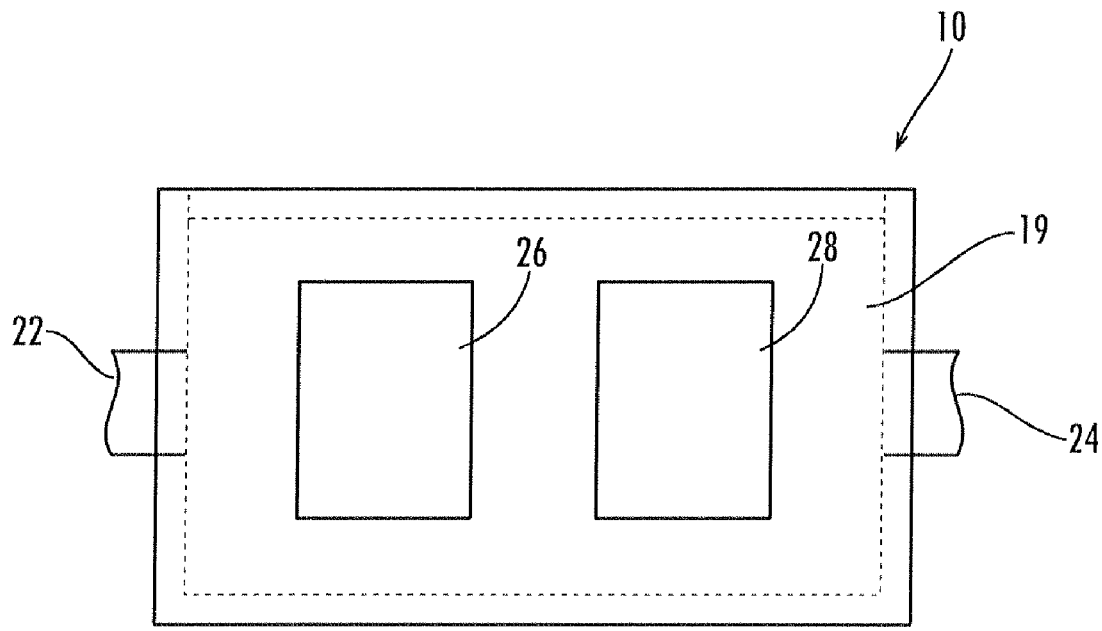
FIG. 5 is a top view of the filtration device of FIG. 1.
Figure 10:
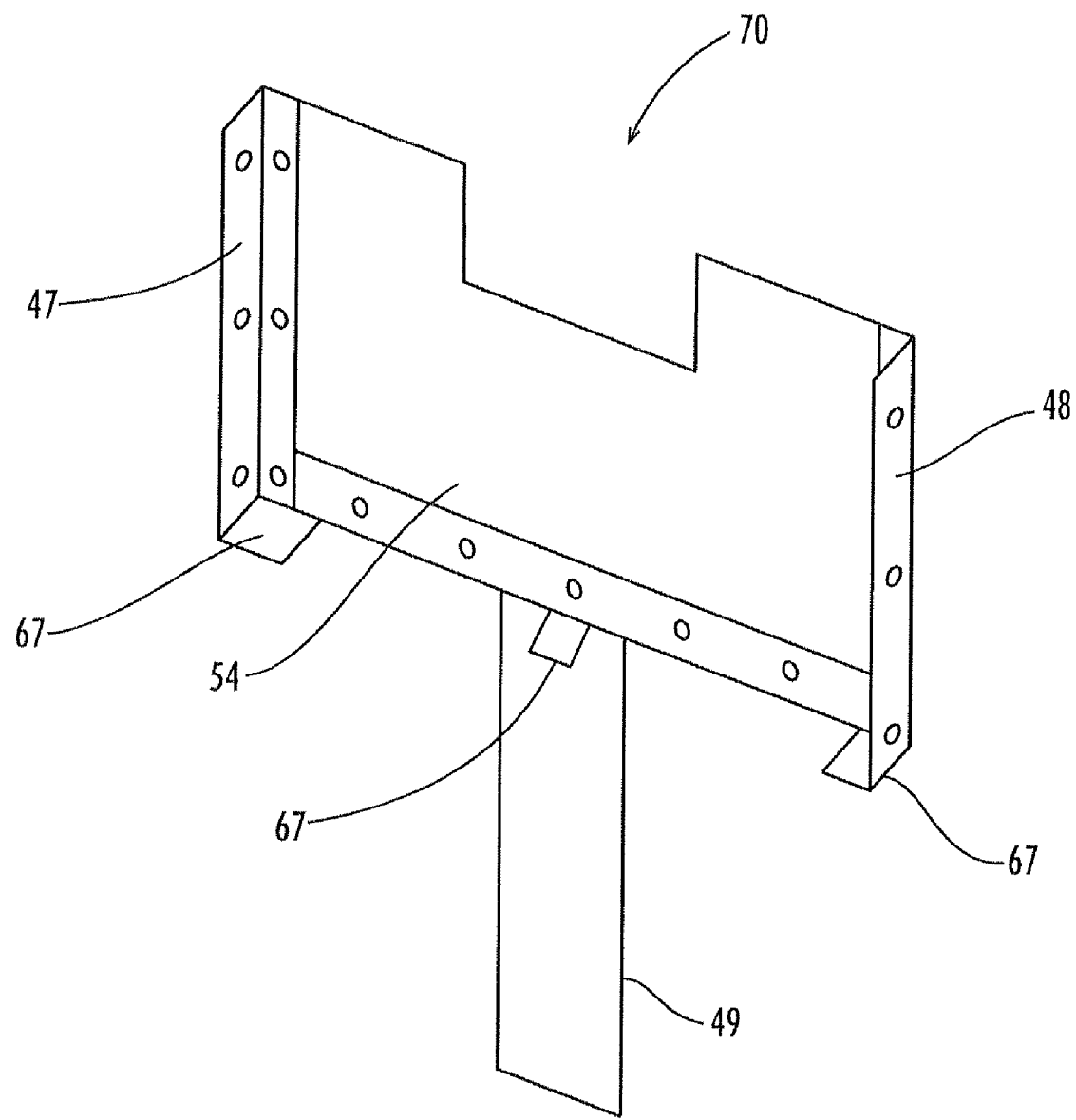
FIG. 10 is a perspective view of a frame member of the weir of FIG. 6.

Referring now to FIGS. 4, 6, and 10, each pivotal filter assembly 50 comprises a weir 52 and a filter 60. The weir 52 has a shell with a bore that receives the filter 60 therein. In the depicted embodiment, the shell is made of two frame members 70 that are coupled together, with each frame member having an inlet side 54, an outlet side 56, edges 47 and 48, a top opening 58 for receiving the filter 60, and a bottom opening 57 that permits the filter 60 to be extended from the weir 52. The bore extends through the weir 52 from the top opening 58 to the bottom opening 57 so that the filter can be slid up through the bore and removed through the top opening 58 at the end of its useful life, and then replaced by a fresh filter. In this way, the weir 52 permits the easy insertion and removal of the filter 60, which is advantageous with respect to the maintenance of the filtration device. In the depicted embodiment, the filter assembly 50 includes two filters 60, though only one or more than two filters can be used.

In one aspect, the weir 52 and filter 60 of each pivotal filter assembly 50 extend the full width of the chamber 12 between the sidewalls 13 and 15, which prevents water from bypassing the filter 60 by going around its side edges. This is best seen in FIG. 4. In another aspect, the filter 60 of each pivotal filter assembly 50 extends to the floor 19 of the chamber 12. This is best seen in FIG. 1. In this way, water is prevented from bypassing the filter 60 by going under it and instead is forced to pass through each filter 60 of each pivotal filter assembly 50. The filter 60 is secured in place extending through the bottom opening 57 of the weir 52 by stops on the weir that engage cooperating stops on the filter. For example, the weir stops can be provided by flanges 67 extending inwardly from opposing edges of the bottom of the weir 52 (see FIG. 10) and the weir stops can be provided by pins 68 extending outwardly from the filter frame 62 (see FIG. 7). Alternatively, the weir and filter stops can be provided by spring-biased pins that are received in apertures for a more secure fit.

The weir 52 of each pivotal filter assembly 50 is pivotally attached to the sidewalls 13 and 15 of the chamber 12. The pivotal filter assemblies 50 can be pivotally attached to the sidewalls 13 and 15 (directly or indirectly with interposed brackets) by pins, dowels, screws, or other pivotal attachment structures. As shown in FIG. 1, when at rest (no waterflow through the chamber 12) the pivotal filter assemblies 50 are positioned at an angle relative to vertical with their bottoms tilted away from the inlet 22. In addition, the weirs 52 each can have one or more extension braces 49 extending from the bottom of the weir frame members 70 to help support the filters 60 against the waterflow. In the depicted embodiment, the extension brace 49 that extends downward from the inlet side 54 abuts against the chamber floor to set the filter 60 at an angle, which prevents the filter bottom from pivoting toward the inlet 22.

In an alternative embodiment, each pivotal filter assembly 50 rests at an angle (with its bottom tilted away from the inlet) on support members such as pins extending inwardly from the sidewalls 13 and 15, instead of the filters 60 or extension braces 49 supporting the pivotal filter assemblies at the angle. In another alternative embodiment, the weirs 52 are fixed in place to the chamber walls and do not pivot, and the filters 60 are pivotally mounted to the fixed weirs. And in still other embodiments, the filter assemblies 50 are in a generally vertical orientation at rest.

Figure 9:
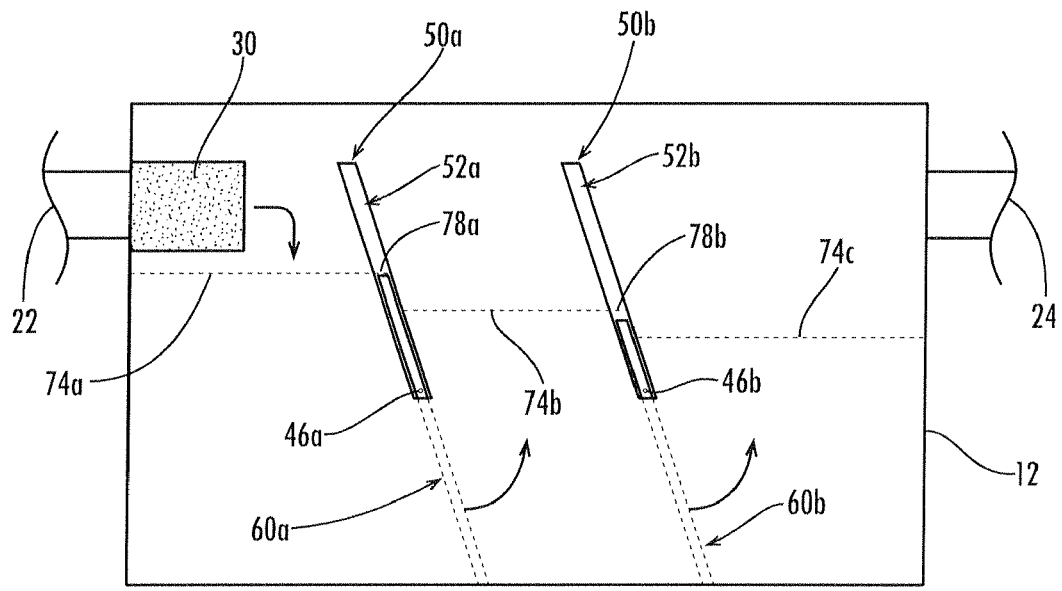
FIG. 9 is a side view schematic of the filtration device of FIG. 1 in bypass mode.

When the filter 60 is inserted into the weir 52, the bottom of the filter assembly 50 is free to pivot away from the inlet 22. As depicted in FIGS. 4 and 9, the filter 60 is secured to the weir 52, and the filter assembly 50 is free to pivot about its pivot point 46. Thus, each filter assembly 50 is capable of pivoting its filter 60 upward and away from the inlet 22. The mechanism for and relevance of this will be discussed in more detail below.

In order to prevent incoming water from leaking past the sides and the bottom of the filter 60, a seal such as a gasket can either be attached to the sidewalls 13 and 15 and bottom 18 of chamber 12 or, in the alternative, they can be attached to side edges of the weir frame 70 and the sides and bottom of the filter 60. The gasket can be made of any durable material such as, for example, rubber that is resistant to constant exposure to water.

Referring to FIGS. 4 and 6, the weirs 52 each have a bypass opening 51 at the top of the weir frame members 70. The weir bypass opening 51 in each weir has a depth 53 and width 55, where the depth is measured from the top of the inlet and outlet sides 54 and 56 to the bottom 78 of the opening. In one aspect, the depth 53 of the weir openings 51 varies by weir 52, with the depth of the weir opening of the weir nearest the inlet 22 being less than the depth of the weir opening of the weir nearest the outlet 24, and with the depth of the weir openings between them increasing sequentially when moving from the inlet 22 toward the outlet 24. This is depicted in FIG. 3, wherein the depth 53a of weir opening 51a is less than the depth 53b of weir opening 51b, which is less than the depth 53c of weir opening 51c, which is less than the depth 53d of weir opening 51d. Alternatively, two or more of the weir openings can have the same depth. Although rectangular openings are depicted in FIGS. 4 and 6, other shapes of openings can be used, including vertical slots, a v-notch, or any other custom shape.

Referring to FIG. 6, the depth 53 of the weir opening 51 in each weir can be adjusted with the use of a weir plate 59. Thus, weirs having the same weir opening depth can be manufactured, and a weir plate 59 can be attached to the weir to set the depth of the weir opening to correspond to the position of the weir in the series of weirs. The weir plate 59 can be fixedly attached to the weir 52 by screws, welding, or other attachment structures, or it can be adjustably coupled to the weir for example by a slidable track for in-field adjustment of the weir opening depth. The weir plate 59 and the weir 52 can be made of the same or different material. In one aspect, the weir plate 59 and weir 52 are made of aluminum, high density polyethylene, ABS plastic, or fiberglass composite.

FIG. 7 depicts a pair of the filters 60 that can be inserted through the bore of the weir 52. In the depicted embodiment, each of the filters 60 has a filter frame 62 with an opening 64 at the top for receiving a filter medium therein. The filter frame 62 has a central opening therethrough covered by a mesh liner 66 on each side that permits water to pass through it while holding the filter medium in place. In one aspect, the filter frame 62 and mesh liner 66 are composed of aluminum. FIG. 7 depicts two filter frames 62 that can be inserted into the weir 52; however, one filter frame holding one filter medium or more than two filter frames holding more than two filter media can be inserted into weir 52.

The opening 64 at the top of filter frame 62 permits the insertion of one or more different filter media into the filter frame. The selection of the filter medium material can vary from one pivotal filter assembly 50 to the next. In one aspect, the filter material in the pivotal filter assembly nearest the inlet 22 can be a very porous material that permits water to readily pass through the filter. An example of such a material includes, but is not limited to, ¾ inch coconut fiber. Thus, in one aspect, the filter material in the pivotal filter assembly nearest the outlet 24 is less porous than the filter material of the pivotal filter assembly nearest the inlet 22. In another aspect, the porosity of each filter material decreases sequentially when going from the pivotal filter assembly nearest the inlet 22 to the pivotal filter assembly nearest the outlet 24. In one aspect, when the filter material is granular, the filter material is placed into a fibrous chamber, and the fibrous chamber is inserted in the filter frame 62 and held in place by the mesh liner 66.

It is contemplated that two or more different filter materials can be combined prior to insertion into the filter frame 62. In one aspect, the filter material is composed of woven or non-woven materials derived from polymers such as, example, polyesters and nylons. Additional compounds can also be used with the filter material to facilitate the removal of pollutants. For example, materials that adsorb dissolved chemicals (e.g., metals) can be combined with the filter materials. Examples of such materials include, but are not limited to, fuller's earth, activated charcoal, or mulch. In other aspects, the filter material can be impregnated with microbicides for killing harmful organisms or oil trapping chemicals. One of ordinary skill in the art will be able to select particular filter materials and additives depending upon the pollutants to be removed.

Examples of filter materials useful herein include, but are not limited to, X-TEX-B12, which is a blend of recycled lipophilic fibers; X-TEX-B12-AM, which is X-TEX-B12 treated on both sides with an antimicrobial; X-TEX-AC-100, which is X-TEX-B12 embedded with activated carbon; X-TEX-Z-200, which is X-TEX-B12 embedded with zeolite; X-TEX-CIAgent, which is X-TEX-B12 embedded with a blend of petroleum-based polymers; X-TEX-B12-SS, which is X-TEX-B12 bonded with a felted polyester rayon blended textile; X-TEX-B12-PE, which is X-TEX-B12 bonded to a polyethylene film. These materials are manufactured by The Xextex Corp. In another aspect, MYCELX, a curable polymeric surfactant technology manufactured by MYCELX Technologies Corporation, can be used herein. In a further aspect, the filter material is Smart Sponge manufactured by Ab Tech Industries, Inc. In other aspects, the filter material can be coconut fiber, a 10 micron filter cloth, activated charcoal, or perlite.

It is contemplated that the filtration devices described herein can be used alone or in combination with other filtration devices to enhance water purification. For example, a chamber can be configured with baffles and/or collection reservoirs to remove oil from the incoming water prior to entering the filtration device 10. In this example, the first chamber is used as a pre-filtration system and is connected to the inlet 22 of device 10. Alternatively, a post-filtration device can be attached to the outlet 24 to further purify the outgoing water. U.S. Pat. No. 6,797,161, which is incorporated by reference in its entirety, discloses suitable pre- and post-filtration devices that can be attached to the filtration devices described herein. It is also contemplated that two or more of the filtration devices described herein can be used in series or in tandem for water purification.

To install the filtration device 10 for operation, the chamber 12 is hauled to the installation site and lowered into a pit in the ground using conventional construction equipment. Then the inlet 22 and the outlet 24 are connected to the storm sewer system pipes. For retrofit installations, the existing storm sewer pipes are cut into and the filtration device 10 installed in-line. For new installations, the new storm sewer pipes are cut to length and connected to the filtration device 10. After installation, the pit is backfilled and the filtration device 10 is now ready for use.

Storage chambers can be installed to hold particular pollutants (e.g., hydrocarbons, detergents, and/or other floating matter). This is typically done when a larger volume of floating matter needs to be stored than can be retained. For example, if a pre-filtration chamber with a collection reservoir is employed, one or more chambers can be lowered into a pit beside or some distance from the pre-filtration device and a drainpipe can be connected between it and the collection reservoir.

Figure 8:
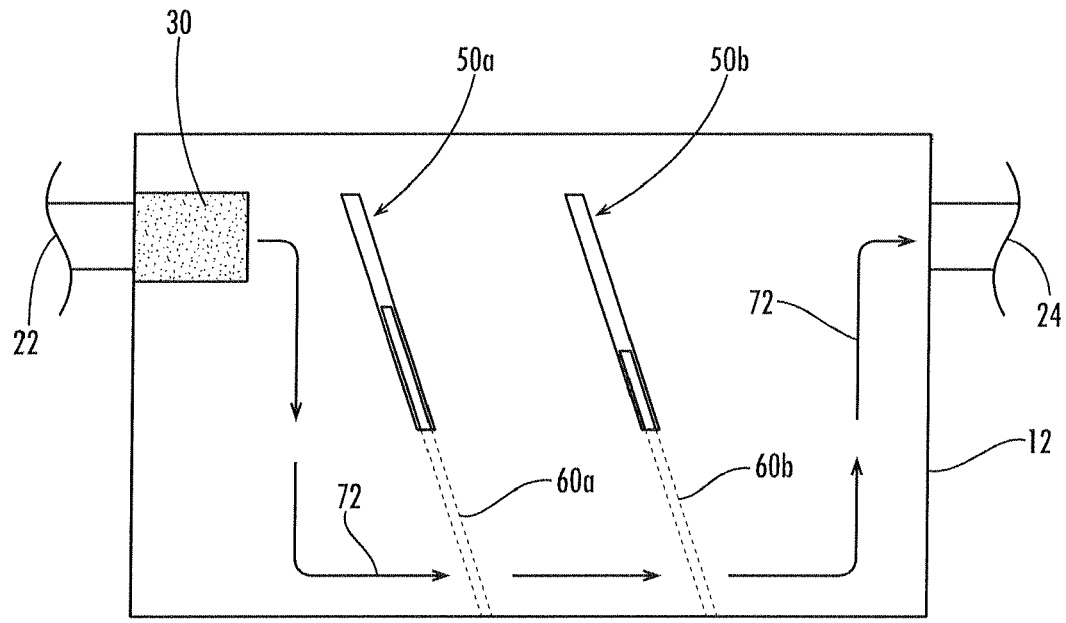
FIG. 8 is a side view schematic of the filtration device of FIG. 1 in use.

Referring to FIGS. 8 and 9, the operation of the filtration device 10 will now be described. Although FIGS. 8 and 9 depict two pivotal filters, additional pivotal filters are contemplated. In general, polluted water or other fluid enters the chamber 12 through the inlet 22 and flows through the screen basket 30, which filters/catches any material that is too large to pass through the basket 30. The water then flows through each filter 60a and 60b of pivotal filter assemblies 50a and 50b, respectively, depositing any material that is too large to pass through the filter material or that is otherwise captured by the filter material. After passing through each of the filters 60a and 60b, the water exits the chamber 12 through the outlet 24. The arrows 72 in FIG. 8 depict waterflow through the device 10.

As shown in FIG. 9, as the water flowrate increases, the water level in the chamber 12 rises. Because the filter 60a of the first filter assembly 50a is more porous for removing larger-sized pollutants than the filter 60b of the second filter assembly 50b, more water can flow through the first filter 60a than the second filter 60b. So the water level 74a between the inlet 22 and the first filter assembly 50a rises to a higher level than the water level 74b between the first and second filter assemblies 50a and 60a, which rises to a higher level than the water level 74c between the second filter assembly and the outlet 24. The weir opening bottom positions 78a and 78b are correlated to the filters 60a and 60b. For example, if the second filter 60b is fragile or can only filter the water up to a certain flowrate, then the weir opening bottom 78b of the second weir is positioned so that the water overflows through the weir opening to bypass the second filter 60b and take it off-line at or before that flowrate capacity is exceeded. The top of the weirs 52 is preferably below the lid 19 of the chamber 12 to permit overflowing in the event of a catastrophic waterflow situation. In an alternative embodiment, instead of having sequentially lower weir opening bottom heights, the second filter 60b for removing smaller-sized pollutants can be larger (relative to the first filter 60a) with a larger filtration surface area (and its weir can have a smaller surface area) so that it allows the same volume of water through it as the smaller-sized filter 60a for removing larger-sized pollutants.

In addition, if the pressure of the water becomes great enough and/or the second filter 60b becomes blocked with enough pollutant, the filter assembly 50b pivots from its filtering position (as shown) back and up (as indicated by the directional arrow) about its pivotal point 46b to its bypass position (not shown) to permit water to pass underneath (i.e., bypass) that filter. But water continues to be filtered through the first filter 84 of filter assembly 50a, which remains in its filtering position. This is advantageous when, for example, there is an unanticipated influx of pollutants of a size too small to be filtered by the first filter 60a and too large to pass through the second filter 60b. This can happen on a season basis, for example, due to road salt in the winter in northern regions, fertilizer runoff during a rainy season, etc., or this can happen due to a change in the conditions of the area from which the water runs off. Regardless, the smaller-sized pollutants will flow through the first filter 60a and be filtered by the second filter 60b, but the larger volume of the pollutants will then clog up the second filter and restrict (and eventually completely block) waterflow through it. As this occurs, the water level rises, but before it gets to the level of the weir opening bottom 78b, the water pressure against the increasingly clogged filter 60b increases until it forces the filter assembly 50b to pivot from the filtering position to the bypass position. This prevents the polluted water from backing up from that filter assembly 50b back to the inlet 22 and instead allows that filter assembly to drop off-line while the remaining on-line filters clean the water. If all of the filters become clogged and all of the pivotal filter assemblies are in the bypass position, then the incoming water will not be filtered.

In an alternative embodiment, the pivot point is at a higher position on the weir frame so that the filter assembly pivots sooner (when the filter is only partially clogged), if so desired. In another alternative embodiment, the filters have a height such that, when they are extended from the weirs to the floor of the chamber, there remains a portion of the filter still within the weir frame. As one of the filter assemblies pivots due to its filter becoming clogged, the portion of the filter still within the weir frame slides downward so that it is now exposed to provide additional clean filtration surface area. As that becomes clogged, the filter assembly pivots further to allow more of the filter to slide down out of the weir. Once the filter has slid down all the way and all the available filtration surface area becomes clogged, the filter assembly pivots to the bypass position.

The number of pivotal filter assemblies and the position of the weir opening bottom for each pivotal filter assembly can vary depending upon the type and size of the pollutants to be removed as well as the flowrate of the incoming water. By varying certain parameters such as, for example, the size of the chamber, the diameter of the inlet/outlet, the weir opening bottom height/position, and the porosity of the filter material, it is possible to control the amount of water to be treated. One of the many advantages of the devices described herein is that if one filter is blocked by debris or pollutants, that filter assembly will pivot to a bypass position and not adversely affect the flowrate and overall performance of the device. As described above, the use of a series of pivotal filter assemblies with sequentially decreasing weir opening bottom heights from the inlet to the outlet permits a steady flowrate of water even if the water is very contaminated with pollutants. For example, if a single filter became clogged and could not pivot, it would cause the flow to become blocked, and the water level would rise to the level of its overflow weir. The result would impact the flow patterns along the base of the device, and the nature of a sharp-crested weir at higher flows can produce excess water levels upstream due to flow resistance. The pivoting feature of the pivotal filter assemblies assures that a single clogged or blocked filter will not impact the remainder of the filters in the system.

Periodic inspections can be conducted to determine if individual filters 60 in the pivotal filter assemblies 50 need to be replaced, or if sediment in the chamber 12 has reached a level where pumping out the chamber is indicated. The individual filters 60 can readily slide out the top of the weirs 52 for cleaning or replacement. Similarly, the screen basket 30 is removable for cleaning or for replacement of the mesh lining.

It will be apparent to those skilled in the art that various modifications and variations can be made to this invention without departing from the spirit or scope of the invention, and that the above-described embodiments are merely intended to be exemplary and not limiting of the invention.

What is claimed is:

1. A device for filtering pollutants from fluid, the device comprising:
   a chamber having an inlet and outlet;
   a plurality of pivotal filter assemblies arranged in series in the chamber between the inlet and the outlet, wherein each filter assembly includes a filter that pivots from a filtering position to a bypass position, in the filtering position the fluid flows through the filter to remove at least some of the pollutants from the fluid, in the bypass position the fluid flows around and bypasses the filter, and the filter pivots from the filtering position toward the bypass position under increased pressure from the fluid flow as the filter becomes clogged with the pollutants, wherein the pivotal filter assemblies each further include a weir, and the corresponding filters extend from the weirs; and
   wherein the weirs each have an open bottom and a bore in communication with the open bottom, wherein the filters are removably received in the corresponding weir bores and extend downwardly from the weirs through the open bottoms.

2. The filtration device of claim 1, wherein the weirs each have an open top with the bore extending all the way through the weir from the open top to the open bottom, wherein the filters are removably received in the corresponding weir bores through the corresponding open tops.

3. The filtration device of claim 1, wherein the weirs are pivotally mounted within the chamber, and the weirs and the corresponding filters pivot together.

4. The filtration device of claim 1, wherein the weirs each have a bypass opening with a depth.

5. The filtration device of claim 4, wherein the filters each include a filter medium having a porosity defining a flowrate capacity, the porosities of the filter media are not all the same, and the depths of the bypass openings are correlated to the porosities of the filter media of the corresponding pivotal filter assemblies so that at least a portion of the fluid flows through the bypass openings of the weirs when or before the corresponding filter media flowrate capacities are reached and so that the filters pivot from their filtering position toward their bypass position in response to filters clogging before the fluid overflows through the corresponding bypass openings.

6. The filtration device of claim 1, wherein the chamber is defined at least in part by a floor and wherein the weirs each include an extension brace that abuts the floor and supports the corresponding filter at an angle relative to vertical.

7. The filtration device of claim 1, further comprising a screen positioned in the chamber adjacent the inlet and above an at-rest fluid level so that pollutants collected by the screen are suspended above the at-rest fluid level.

8. A device for filtering pollutants from fluid, the device comprising:
   a chamber having an inlet and outlet;
   a plurality of pivotal filter assemblies arranged in series in the chamber between the inlet and the outlet, wherein each filter assembly includes a filter that pivots from a filtering position to a bypass position, in the filtering position the fluid flows through the filter to remove at least some of the pollutants from the fluid, in the bypass position the fluid flows around and bypasses the filter, and the filter pivots from the filtering position toward the bypass position under increased pressure from the fluid flow as the filter becomes clogged with the pollutants, wherein the pivotal filter assemblies each further include a weir, and the corresponding filters extend from the weirs, wherein the weirs each have a bypass opening with a depth; and
   wherein the depth of the weir bypass opening of the pivotal filter assembly nearest the inlet is less than the depth of the weir bypass opening of the pivotal filter assembly nearest the outlet.

9. The filtration device of claim 8, wherein the filters each include a filter medium having a porosity defining a flowrate capacity, the filter medium of the pivotal filter assembly nearest the inlet has a greater porosity than the filter medium of the pivotal filter assembly nearest the outlet, and the depths of the bypass openings are correlated to the porosities of the filter media of the corresponding pivotal filter assemblies so that at least a portion of the fluid flows through the bypass openings of the weirs when or before the corresponding filter media flowrate capacities are reached and so that the filters pivot from their filtering position toward their bypass position in response to filters clogging before the fluid overflows through the corresponding bypass openings.

10. The filtration device of claim 8, wherein the depths of the weir bypass openings of the pivotal filter assemblies increase sequentially from the pivotal filter assembly nearest the inlet to the pivotal filter assembly nearest the outlet.

11. A device for filtering pollutants from fluid, the device comprising:
   a chamber having an inlet and outlet; and
   a plurality of pivotal filter assemblies arranged in series in the chamber between the inlet and the outlet, wherein each filter assembly includes a weir and a filter extending from the weir,
   wherein the filters each pivot from a filtering position to a bypass position, in the filtering position the fluid flows through the filter to remove at least some of the pollutants from the fluid, in the bypass position the fluid flows around and bypasses the filter, and the filter pivots from the filtering position toward the bypass position under increased pressure from the fluidflow as the filter becomes clogged with the pollutants, wherein each one of the filters is pivotal from its filtering position to its bypass position independently of each other one of the filters so that as one of the filters becomes clogged it pivots to its bypass position while the other unclogged filters remain in their filtering positions, and wherein the filters each include a filter medium having a porosity defining a flowrate capacity, wherein the filter medium of the pivotal filter assembly nearest the inlet has a greater porosity than the filter medium of the pivotal filter assembly nearest the outlet, and
   wherein the weirs each have a bypass opening with a depth, the depth of the weir bypass opening of the pivotal filter assembly nearest the inlet is less than the depth of the weir bypass opening of the pivotal filter assembly nearest the outlet, and the depths of the bypass openings are correlated to the porosities of the filter media of the corresponding pivotal filter assemblies so that at least a portion of the fluid flows through the bypass openings of the weirs when or before the corresponding filter media flowrate capacities are reached and so that the filters pivot from their filtering position toward their bypass position in response to filters clogging before the fluid overflows through the corresponding bypass openings.

12. The filtration device of claim 11, wherein the porosities of the filter media of the pivotal filter assemblies decrease sequentially from the pivotal filter assembly nearest the inlet to the pivotal filter assembly nearest the outlet so that as the fluid flows through the chamber from the inlet to the outlet the filters sequentially filter out smaller and smaller sized pollutants.

13. The filtration device of claim 12, wherein the depths of the weir bypass openings of the pivotal filter assemblies increase sequentially from the pivotal filter assembly nearest the inlet to the pivotal filter assembly nearest the outlet.

* * * * *